United States Patent [19]

Christe et al.

[11] 4,102,984

[45] Jul. 25, 1978

[54] PHOTOLYSIS METHOD FOR PRODUCING $NF_4PF_6$

[75] Inventors: Karl O. Christe, Calabasas; Carl J. Schack, Chatsworth, both of Calif.

[73] Assignee: Rockwell International Corporation, El Segundo, Calif.

[21] Appl. No.: 732,244

[22] Filed: Oct. 14, 1976

[51] Int. Cl.² ............................................. C01B 25/10
[52] U.S. Cl. ..................................... 423/301; 423/351
[58] Field of Search ......................... 423/301, 302, 351

[56] References Cited

U.S. PATENT DOCUMENTS 3,503,719  3/1970  Christe et al. ........................ 423/351
3,708,570  1/1973  Tolberg ................................ 423/302

OTHER PUBLICATIONS

Christe et al., Inorganic Chemistry, vol. 12, No. 10, pp. 2478-2481, 1973.
Goetschel et al., Inorganic Chemistry, vol. 11, No. 7, pp. 1696-1701, 1972.

*Primary Examiner*—Earl C. Thomas
*Assistant Examiner*—Gregory A. Heller
*Attorney, Agent, or Firm*—L. Lee Humphries; Robert M. Sperry

[57] ABSTRACT

A method of producing $NF_4PF_6$ by ultraviolet photolysis at $-196°$ C of a mixture of $NF_3$, $F_2$ and $PF_5$.

1 Claim, No Drawings

PHOTOLYSIS METHOD FOR PRODUCING NF$_4$PF$_6$

The invention herein described was made in the course of or under a contract or subcontract thereunder, (or grant) with the United States Navy.

BACKGROUND OF THE INVENTION

1. Field of the Invention

This invention relates to methods for producing materials and is particularly directed to an improved method for producing NF$_4$PF$_6$.

2. Description of the Prior Art

NF$_4$$^+$ salts are the key ingredients for solid propellant NF$_3$—F$_2$ gas generators, such as that taught by D. Pilipovich in U.S. Pat. No. 3,963,542 for chemical HF—DF lasers. Whereas NF$_4$SbF$_6$ and NF$_4$AsF$_6$ can be prepared with relative ease, using the methods of W. E. Tolberg et al, U.S. Pat. No. 3,708,570, and K. O. Christe et al, U.S. Pat. No. 3,503,719, these compounds suffer from the disadvantage of containing a relatively heavy anion, thus decreasing their performance in an NF$_3$—F$_2$ gas generator. This disadvantage can be overcome by replacing the SbF$_6$$^-$ or AsF$_6$$^-$ anion by the lighter PF$_6$$^-$ anion. The existence of this salt has previously been claimed by Tolberg et al. (U.S. Pat. No. 3,708,570), but their production process was so inefficient that they could not isolate an amount of material sufficient for its isolation, identification, and characterization.

BRIEF SUMMARY AND OBJECTS OF INVENTION

This problem of synthesizing NF$_4$PF$_6$ is overcome by the present invention and an efficient method was found for producing NF$_4$PF$_6$. The method of the present invention involves low-temperature uv-photolysis of a mixture of NF$_3$, F$_2$, and PF$_5$ according to:

$$NF_3 + F_2 + PF_5 \xrightarrow[-196° C]{h\nu} NF_4PF_6$$

This method provides NF$_4$PF$_6$ of high purity.

Accordingly, it is an object of the present invention to provide an improved process for the production of NF$_4$PF$_6$.

This and other objects and features of the present invention will be apparent from the following examples.

DETAILED DESCRIPTION OF THE INVENTION

In a typical experiment, NF$_3$ and PF$_5$ (27 mmol of each) were condensed into the cold (−196° C) bottom of a pan-shaped quartz reactor. This reactor had a flat top consisting of a 3-in. diameter optical grade quartz window. The vessel had a side arm connected by a Teflon O ring to a Fischer-Porter Teflon valve to facilitate removal of solid reaction products. The depth of the reactor was about 1.5 in. and its volume was 135 ml. The uv source consisted of a 900-W air-cooled high-pressure mercury arc (General Electric Model B-H6) and was positioned 1.5 in. above the flat reactor suface. The bottom of the reactor was kept cold by immersion in liquid N$_2$. Dry, gaseous N$_2$ was used as a purge gas to prevent condensation of atmospheric moisture on the flat top of the reactor. As a heat shield a 0.25 in. thick quartz plate was positioned between the uv source and the top of the reactor. Fluorine (9 mmol) was added and the mixture was photolyzed at −196° C for 1 h with a 900-W high-pressure Hg arc in the manner described above. After termintion of the photolysis, volatile material was pumped out of the reactor during its warm-up to room temperature. The non-volatile white solid product consisted of 10 mg of NF$_4$PF$_6$.

The salt NF$_4$PF$_6$ is a white, crystalline, hygroscopic solid, stable at room temperature, but rapidly decomposing at 245° C. Its characteristic x-ray diffraction powder pattern is listed in Table I. Its vibrational spectrum is listed in Table II and establishes the ionic nature of the salt, i.e. the presence of discrete NF$_4$$^+$ cations and PF$_6$$^-$ anions. This was further confirmed by $^{19}$F nmr spectroscopy in HF solution which showed the triplet (J$_{NF}$ = 230 H$_z$ at $\phi$ = −217) characteristic for NF$_4$$^+$.

TABLE I

| X-RAY POWDER DATA FOR NF$_4$PF$_6$$^a$ | | | |
|---|---|---|---|
| d obsd | d caldc | Int | h k l |
| 5.40 | 5.36 | ms | 1 1 0 |
| 4.55 | 4.53 | s | 1 0 1 |
| 3.91 | 3.89 | vs | 1 1 1 |
| 3.79 | 3.79 | s | 2 0 0 |
| 2.91 | 2.91 | ms | 2 1 1 |
| 2.65 | 2.65 | m | 1 0 2 |
| 2.40 | 2.40 | vw | 3 1 0 |
| 2.307 | 2.305 | m | 3 0 1 |
| 2.204 | 2.205 | vw | 3 1 1 |
| 2.171 | 2.171 | mw | 2 1 2 |
| 1.882 | 1.883 | ms | 3 0 2, 0 0 3 |
| 1.825 | 1.827 | vw | 3 1 2, 1 0 3 |
| 1.784 | 1.785 | w | 3 3 0 |
| 1.747 | 1.747 | mw | 4 1 1 |
| 1.685 | 1.685 | w | 3 2 2, 2 0 3 |
| 1.646 | 1.646 | w | 2 1 3 |
| 1.622 | 1.622 | w | 4 2 1 |
| 1.536 | 1.540 | vw | 4 1 2 |
| 1.485 | 1.486 | vw | 5 1 0 |
| 1.464 | 1.463 | vw | 5 0 1 |
| 1.437 | 1.437 | w | 5 1 1 |
| 1.408 | 1.407 | vw | 5 2 0 |
| 1.365 | 1.365 | vw | 5 2 1, 1 1 4 |
| 1.333 | 1.335 | w | 5 0 2 |
| 1.318 | 1.319 | vw | 4 4 0 |
| 1.302 | 1.304 | vw | 2 1 4 |
| 1.259 | 1.259 | w | 4 2 3 |
| 1.214 | 1.216 | w | 6 1 1 |

$^a$tetragonal, a = 7.577, C = 5.653A, Cu K$_\alpha$ radiation Ni filter

TABLE II

| VIBRATIONAL SPECTRUM OF NF$_4$PF$_6$ | | |
|---|---|---|
| Observed Ir | Frequency (cm$^{-1}$) Raman | Assignments for NF$_4$$^+$ (T$_d$) |
| 2380 vw | | 2$\nu_3$(A$_1$ + E + F$_2$) = 2320 |
| 2320 w | | |
| 2005 w | | $\nu_1$ + $\nu_3$(F$_2$) = 2008 |
| 1765 w | | $\nu_3$ + $\nu_4$(A$_1$ + E + F$_2$) = 1769 |
| 1457 w | | $\nu_1$ + $\nu_4$(F$_2$) = 1457 |
| 1221 mw | | 2$\nu_4$(A$_1$ + E + F$_2$) = 1218 |
| 1166 vs | 1168 (1.5) | } $\nu_3$(F$_2$) |
| | 1150 (0.8) | |
| 1135 vw | | |
| 1056 vw | | $\nu_2$ + $\nu_4$(F$_1$ + F$_2$) = 1049 |
| | 880 (0.2) | 2$\nu_2$(A$_1$ + A$_2$ + E) = 880 |

TABLE II-continued
VIBRATIONAL SPECTRUM OF $NF_4PF_6$

| | 849 (8.2) | $\nu_1(A_1)$ |
|---|---|---|
| 611 m | 609 (7.4) | $\nu_4(F_2)$ |
| 608 m | | |
| | 441 (2.9) | $\nu_2(E)$ |
| | | Assignments for $PF_6^-(O_h)$ |
| 1590 w | | $\nu_1 + \nu_3(F_{1u}) = 1590$ |
| 1414 w | | $\nu_2 + \nu_3(F_{1u} + F_{2u}) = 1413$ |
| 1308 vw | | $\nu_1 + \nu_4(F_{1u}) = 1307$ |
| 842 vs | 838 (1.5) | $\nu_3(F_{1u})$ |
| 789 w | | |
| 749 w | 748 (10) | $\nu_1(A_{1g})$ |
| | 571 (0.8) | $\nu_2(E_g)$ |
| 559 s | | $\nu_4(F_{1u})$ |
| 474 vw | 469 (1.2) | $\nu_5(F_{2g})$ |

Obviously, numerous variations and modifications may be made without departing from the present invention. Accordingly, it should be clearly understood that the form of the present invention described above is illustrative only and is not intended to limit the scope of the present invention.

We claim:

1. A process for the production of $NF_4PF_6$ characterized by photolyzing a mixture of $NF_3$, $F_2$ and $PF_5$ having an approximate mol ratio of 3:1:3 at $-196°$ C and removing unreacted volatile starting materials from the non-volatile $NF_4PF_6$ product by pumping at ambient temperature.

* * * * *